J. T. PAXTON.
CIRCULAR KNITTING MACHINE.
APPLICATION FILED SEPT. 14, 1908.
1,068,603.
Patented July 29, 1913.
6 SHEETS—SHEET 1.
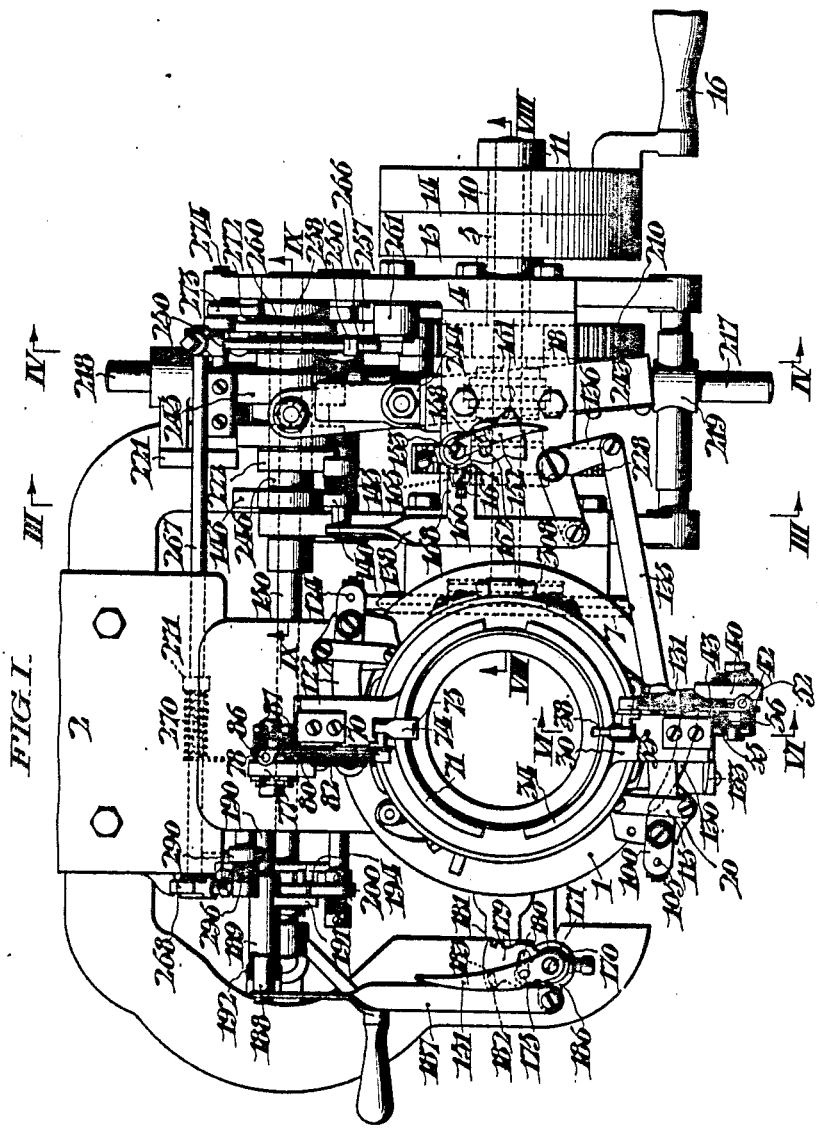
FIG. I.
WITNESSES:
INVENTOR:
JOSEPH T. PAXTON.

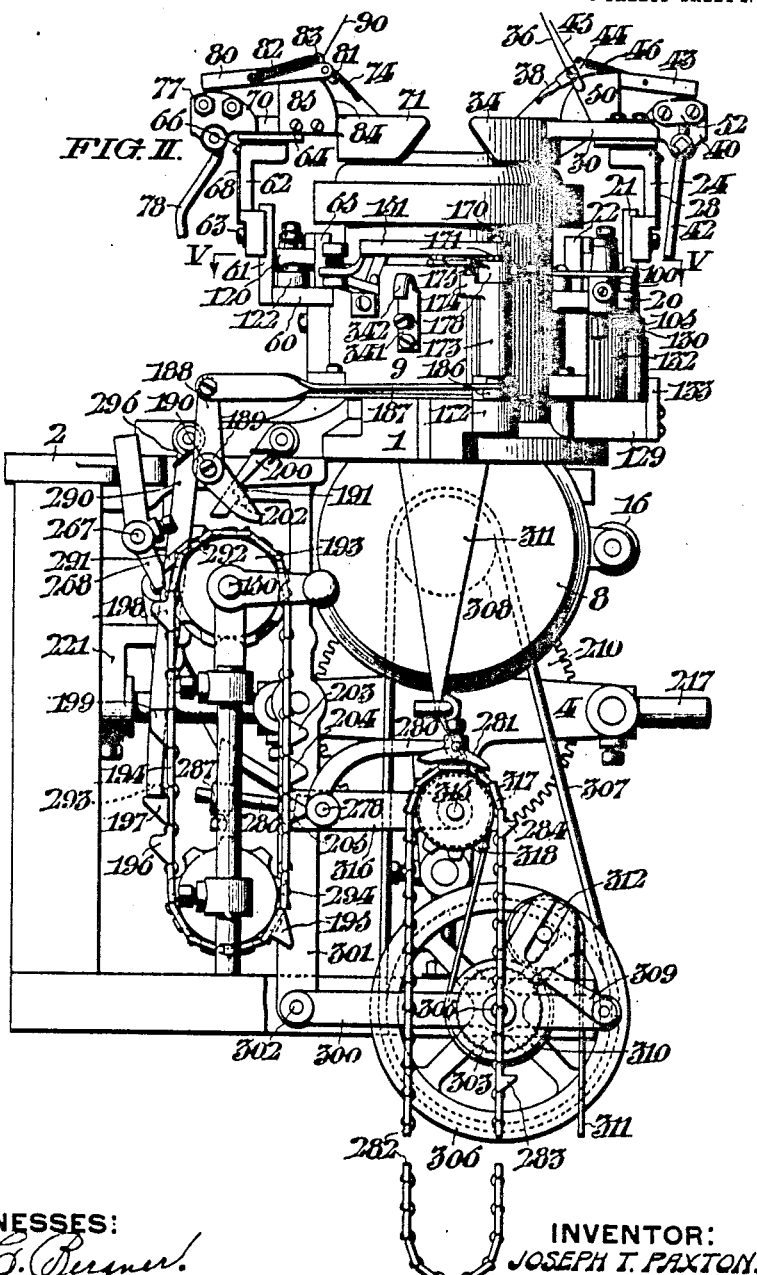

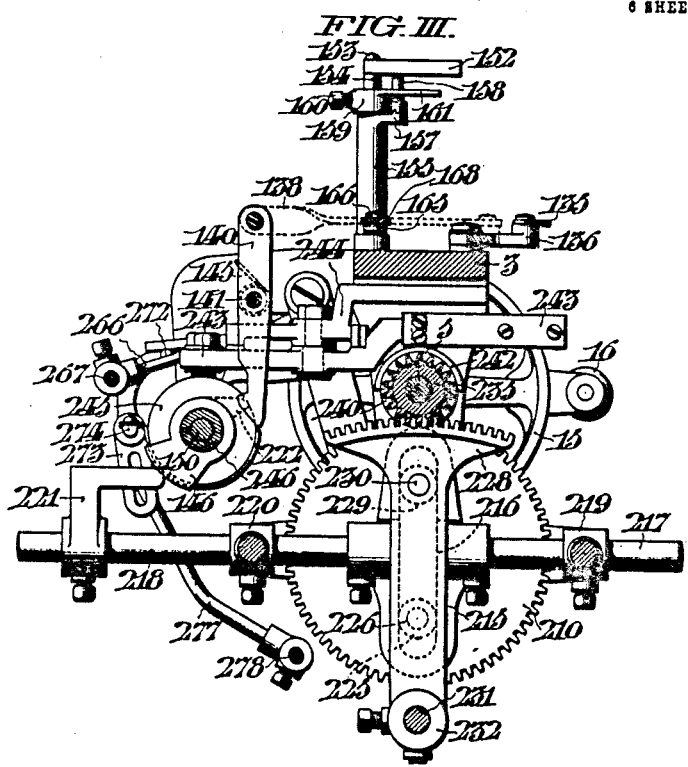
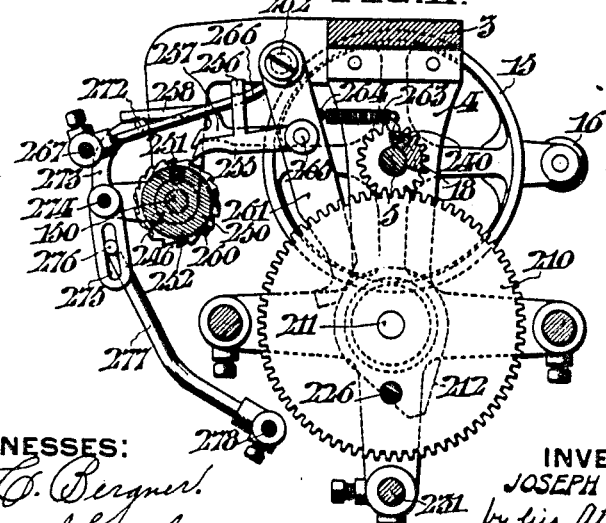

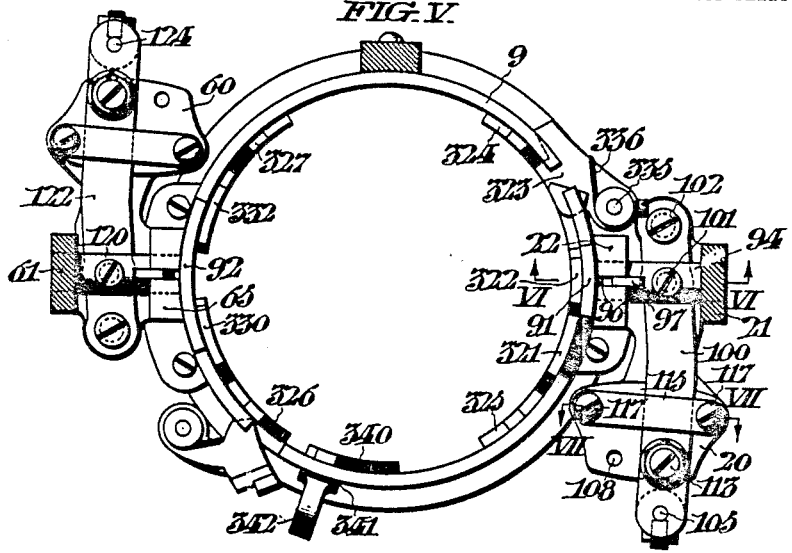

J. T. PAXTON.
CIRCULAR KNITTING MACHINE.
APPLICATION FILED SEPT. 14, 1908.
1,068,603.
Patented July 29, 1913.
6 SHEETS—SHEET 5.
FIG. VIII.
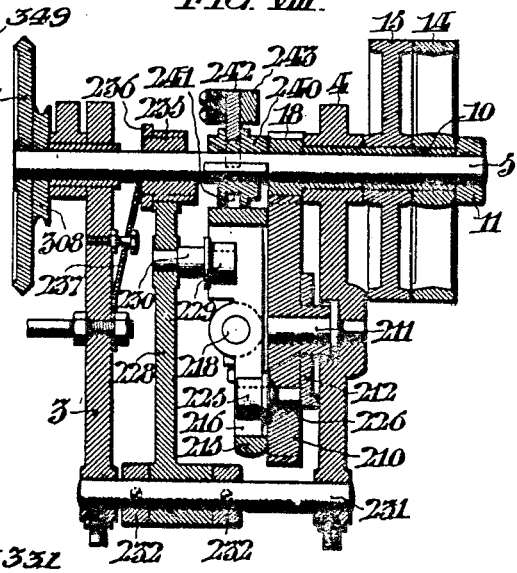
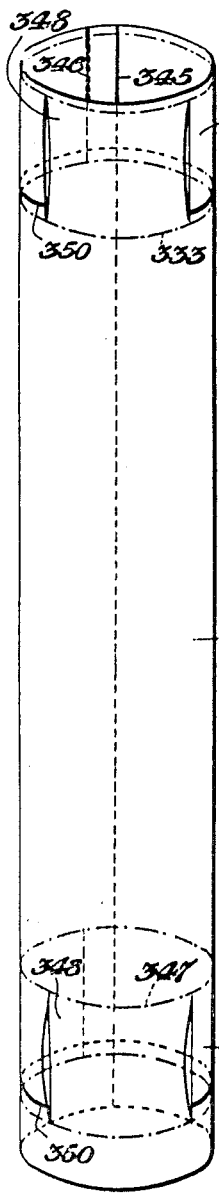
FIG. XIII.
FIG. IX.
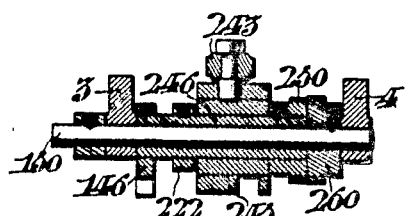
WITNESSES:
John E. Bergner
Wm. J. Speirl
INVENTOR:
JOSEPH T. PAXTON,
by his attorneys

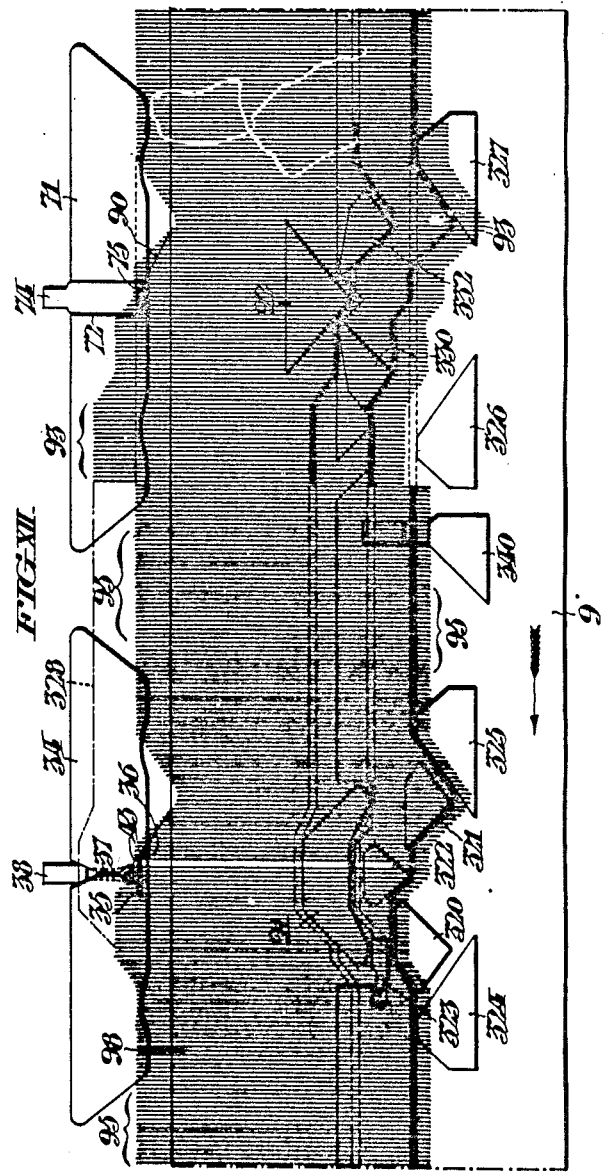

UNITED STATES PATENT OFFICE.

JOSEPH T. PAXTON, OF PHILADELPHIA, PENNSYLVANIA, ASSIGNOR TO JOHN B. PAXTON AND ELLIS I. O'NEILL, BOTH OF PHILADELPHIA, PENNSYLVANIA.

CIRCULAR-KNITTING MACHINE.

1,068,603.   Specification of Letters Patent.   Patented July 29, 1913.

Application filed September 14, 1908. Serial No. 452,987.

*To all whom it may concern:*

Be it known that I, JOSEPH T. PAXTON, of Philadelphia, in the county of Philadelphia and State of Pennsylvania, have invented certain new and useful Improvements in Circular-Knitting Machines, whereof the following is a specification, reference being had to the accompanying drawings.

My invention relates to a circular knitting machine arranged to knit in indefinite alternation a tubular web and a plurality of flat, selvaged webs in integral prolongation of such tubular web.

The object of my invention is to produce a machine which will automatically knit such tubular and flat webs in indefinite alternation as "string work."

In producing the continuous tubular web there is a spiral progression around the needles of a single feed, whereas in the production of the integral flat webs, one or more (preferably two), there is independent reciprocatory manipulation of a limited continuous series of the needles, and the employment of a feed for each such series; as for example, two feeds on opposite sides of the machine during its reciprocation, whereby two threads are simultaneously led back and forth with the production of two selvaged webs. To accomplish this separate operation of a limited continuous series of needles which form part of a circle of needles, it is convenient to differentiate the series by employing needles having single and double butts, whereby they are capable of being independently controlled.

In the accompanying drawings, Figure I, is a plan view of a knitting machine conveniently embodying my invention. Fig. II, is a side elevation of said machine as viewed from the left hand side of Fig. I. Fig. III, is a vertical section taken on line III, III, in Fig. I. Fig. IV, is a vertical section taken on line IV, IV, in Fig. I. Fig. V, is a horizontal section taken on line V, V, in Fig. II. Fig. VI, is a vertical section taken on line VI, VI, in Figs. I and V. Fig. VII, is a vertical section taken on line VII, VII, in Fig. V. Fig. VIII, is a vertical longitudinal sectional view taken on the line VIII, VIII, in Fig. I. Fig. IX, is a vertical longitudinal sectional view taken on the line IX, IX, in Fig. I. Figs. X and XI, are views showing respectively the single and double butt needles employed. Fig. XII, is a development of the cam cylinder showing the auxiliary cams and thread feeding mechanism in the positions assumed during reciprocatory knitting. Fig. XIII, is a perspective view of the string work produced by the machine.

In order that the drawings may be more easily understood, it will be convenient to divide the description into sections, as follows:

I. Parts relating to the main driving mechanism.

II. Thread feeding mechanism.

III. Auxiliary cams and mechanism for operating them.

IV. Mechanism for controlling movements of thread fingers.

V. Mechanism for changing rotation to oscillation and vice versa, comprising, (a) oscillating mechanism; (b) automatic clutch; (c) pattern chain and its pawling mechanism (d) measuring mechanism and connections whereby it controls the movements of the pattern chain.

VI. Relations of cams to various kinds of needles.

*I. Parts relating to the main driving mechanism.*—The bed plate 1, has a rearwardly projecting supporting leaf 2, and depending bearing frames 3, and 4, which latter are arranged to support the driving and motion changing mechanism. The driving mechanism comprises the main shaft 5, upon which is mounted a bevel gear 7, protected by a guard 8, and meshing with a similar gear on the under side of the cam cylinder 9. Said shaft 5, is journaled in a sleeve 10, and prevented from lateral movement by a collar 11, said sleeve being journaled in the frame 4, and provided with tight and loose pulleys 14, and 15, respectively, the former having the usual handle 16. A pinion 18, carried by the sleeve 10, is formed on one end into a sector which engages a similar sector on the adjoining face of the clutch cam 240, slidably keyed on the shaft 5, to impart rotary motion to said shaft.

*II. Thread feeding mechanism.*—A shelf 20 is secured to the cylinder 9 and is provided with upwardly extending portions 21 and 22. A bracket 24 is secured to the portion 21 by screws 25. A plate 26 is pivoted to the bracket and is formed with a triangular projection 27. A spring 28 secured to the bracket 24, has its upper end bent to conform to the bevels on said triangular projection, and operates to maintain said plate 26 in horizontal or tilted position. A thread-guiding plate 30 is secured by screws 31 passing through slots 32 to the plate 26. Said plate 30 has a thread-guiding eye 33. The inner end of said plate 30 is formed with a semi-circular rim 34, having a thread eye 35 near its lower edge at the center. Leading into the thread eye 35 is a slot 37, which permits the thread-carrying finger 38, having a thread-eye 48, to be brought into feeding position during reciprocatory knitting. Upon the outer end of the plate 30 is a lug 40, in which the finger 42 is pivotally mounted. This finger 42 supports an arm 43, carrying a pivoted shoe 44 at its free end. This shoe carries the thread finger 38. A coiled spring 46 is attached to the arm 43, and to a lug 47 on the shoe 44. This spring maintains the shoe 44 in contact with the cam surface 49 on the plate 50. The finger 42 is held in its inner or outer position by a plate 52 loosely mounted on bolts 53 and 54 carried by the lug 40. Around these bolts are coiled springs 55 and 56 respectively. These hold the plate 52 against the finger 42, and tilt the plate to retain the finger in whichever position it may be thrown.

The thread 36, guided by the eyes 33 and 35, is alone employed for circular knitting. The thread 45, led through the eye 48, is fed to the single butt needles during reciprocatory knitting in the forming of the web at the heel and tabs of the stocking. A shelf 60 secured to the cam cylinder has upwardly extending portions 61 and 65. A bracket 62 is secured by screws 63 to the portion 61. This bracket pivotally supports a plate 64, having triangular projections 66, co-acting with the spring 68, attached to the bracket. The spring maintains the plate 64 in a horizontal or tilted position. The plate 70 is adjustably mounted on the plate 64 and has a semi-circular rim 71 formed with a slot 72 extending downwardly from its upper edge, and also passing through the horizontal portion of the plate, similar to that in the plate 30, as shown in Fig. VI. The slot 72 is for the thread finger 74, which has an eye 75. The outer end of the plate 70 carries a lug 77, within which a finger 78 is pivotally mounted. An arm 80 is attached to the finger 78 and has a shoe 81 pivoted on its free end, which shoe carries a thread finger 74. A coiled spring 82 is attached to the arm 80 and to a lug 83 on the under side of the shoe 81. This spring holds the shoe in contact with a cam surface 84 on the plate 85, secured to the plate 70, and controls the movement of the finger 74. The finger 78 is held in its inner and outer positions by a plate 86, loosely mounted on screws 87, and spring pressed, similarly to plate 52. The thread 90 passes through the eye 75 in the finger 74 and is fed to the double butt needles during reciprocatory knitting in the instep web.

*III. Auxiliary cams and mechanism for operating them.*—During reciprocatory knitting the auxiliary cams 91, 92, are thrown in by mechanism which will now be described. Cam 91, is mounted upon the end of a horizontal plunger 94, which is slidably mounted in the upwardly extending projections 21, and 22. The latter is slotted at 96, to form a guide for the key 97, on the plunger 94. Said plunger 94, is connected to a lever 100, by means of a screw 101, said lever being pivotally attached to the shelf 20, by means of a screw 102. Projecting from the under side of the free end of the lever 100, is a pin 105, adapted to be engaged by a cam which moves said lever in and out to throw the auxiliary cam 91, into or out of action. In the upper surface or shelf 20, are two hemispherical cavities 107, 108, each adapted in turn to receive a ball 109, moving in a hole 110, extending through the lever 100. Said ball 109, is pressed downwardly by a spring 112, the tension of which may be varied by a screw 113, bearing upon its upper end. This spring pressed ball acts to maintain the lever 100, in either of its extreme positions. A plate 115, is supported upon blocks 116, 116, and secured thereto by means of screws 117, said plate acting as a guide for the lever 100. Auxiliary cam 92, is secured to a plunger 120, which is similar in construction to plunger 94, described above and moved by a lever 122, having a downwardly projecting pin 124, in its free end. The pins 105, and 124, are arranged to be engaged by a cam 130, which may be moved into the path of said pins to throw the auxiliary cams 91, and 92, into and out of operation at predetermined intervals. The cam 130, is pivoted to a lug 129, on the bed plate 1, and is formed in the shape of a bell crank lever having a short arm 131, and a depending projection 132, adapted to come in contact with a stop 133, to limit the outward movement of said cam, best shown in Fig. II. The short arm 131, is pivotally connected to a link 135, which in turn is connected to an arm of a bell crank lever 136, pivotally mounted upon the bearing frame 3. The other arm of the bell crank lever 136, is connected by means of a link 138, to the upper end of a lever 140, pivotally mounted upon a stud 141, in a rearwardly extending arm on the bearing frame 3. A spring 145, is secured to said lever and coiled about said stud to normally maintain the lever in the position shown in Fig. III, and the cam 130, in the position shown in Fig. I. The lower end of the lever 140, is adapted to engage the periphery of a cam 146, on the counter shaft 150, which is rotated in a manner to be hereinafter described.

IV. *Mechanism for controlling movements of thread fingers.*—In order to throw the thread fingers 38, and 74, into and out of action, the pivoted cams 151, and 152, are respectively provided. Cam 152, is pivotally mounted about a screw 153, projecting from the upper end of a vertical post 154, which is supported by the bearing frame 3. Surrounding the post 154, is a sleeve 155, having a laterally projecting lug 157, which supports an upwardly extending pin 158, which enters a hole in the cam 152, and acts as a driver for said cam when the sleeve 155, is partially rotated. Surrounding said post 154, above the upper end of the sleeve 155, is a collar 159, secured to said post by a set screw 160, and provided with a laterally extending shelf 161, having a curved slot 162, through which the pin 158 passes and by which its motion is limited. At the lower end of said sleeve 155, is a lateral projection 165, holding an upwardly extending screw 166, which is guided in a slot 167, formed in a lateral projection 168, on the link 138. By the mechanism above set forth it will be seen that when the cam 146, is in contact with the lower end of the lever 140, the upper end of said lever is thrown to the left of its position in Fig. III, and with it the link 138, and the arm of bell crank 136, connected thereto. The other arm of said bell crank is thrown to the left of its position in Fig. I and with it the short arm 131, of the cam lever 130. Thus the point of cam 152, is thrown inwardly to the path of the finger 78, and simultaneously therewith the point of cam 130, is thrown outwardly to the path of the pins 105, and 124, to throw auxiliary cams 91, and 92, into operative positions. When lever 140, is freed from cam 146, the cams 130, and 152, are simultaneously returned to their normal position under the action of the spring 145, thereby causing cams 91, and 92, and thread finger 74, to be withdrawn from operative position.

The cam 151, is pivoted about a screw 170, in the upper end of a vertical post 171, which is supported by a bracket 172, secured to the bed plate 1. Surrounding the post 171, is a sleeve 173, having a laterally projecting lug 174, which supports an upwardly projecting pin 175, which enters a hole in the cam 151, and acts as a driver for said cam when the sleeve is partially rotated. Secured to said post 171, above the upper end of the sleeve 173, is a collar 178, having a laterally projecting shelf 179, which is provided with a curved slot 180, through which the pin 175, passes. Said shelf 179, is also provided with two upwardly extending lugs 181, 182, which form stops for the lug 183, on the under side of the cam 151. At the lower end of said sleeve 173, is a laterally extending arm 186, to which one end of a link 187, is pivotally attached. The other end of said link 187, is pivotally attached to a crank arm 188, formed on one end of a sleeve 189, pivotally mounted about a horizontal stud 190, projecting from a side of the supporting shelf 2. Extending downwardly from the sleeve 189, is a tappet arm 191, which is adapted to be engaged by the high side links 195, and 197, on the pattern chain 194, as will be more fully explained. When said tappet arm 191, is moved upwardly by either of said high side links, it is maintained in its raised position by a spring pressed hook 200, which is mounted upon a stud projecting laterally from the bed plate 1, and adapted to engage with a lug 202, on the side of said arm. Said arm 191, is thus held in its raised position until the lower end of the hook 200, is raised by either of the high links 196, or 198, whereupon the lug 202, is freed from said hook and said arm drops under the action of a coiled spring 192, secured to the sleeve 189, and the stud 190.

V. *Mechanism for Changing Rotation to Oscillation and Vice Versa.*

(a) The pinion 18, carried by the sleeve 10, meshes with a gear 210, carrying a cam 212, and rotating on the stationary stud 211, in the frame 4. A yoke 215, having the slot 216, comprises the alined slide bars 217, 218, arranged to slide in the adjustable guides 219, 220, which are rigidly secured to arms on the frame 4. Said yoke is arranged to be reciprocated by the engagement of its slot 216, with a roller 225, on the crank pin 226, carried by the gear 210. Said yoke 215, is arranged to transmit oscillatory motion to a gear sector 228, by the engagement of its slot with a roller 229, carried by a crank pin 230, on said sector. Said sector 228, is fulcrumed on a stationary shaft 231, which rigidly connects the lower ends of frames 3, and 4; said sector being mounted between collars 232, which are secured to said shaft by set screws. When said yoke 215, is reciprocated by its connection with the gear 210, the sector 228, transmits oscillatory motion to a pinion 235, which is loosely mounted on the shaft 5. Said pinion 235, has a circumferential flange 236, which is pressed against the side of the sector 228, by a flat spring 237.

(b) *Automatic clutch.*—A clutch collar 240, is mounted on the shaft 5, between the pinions 18, and 235, to slide longitudinally but guided by a key. Said clutch collar 240, has sectoral lugs on its opposite ends arranged to alternately engage sectoral lugs on the pinions 18, and 235. Said clutch collar 240, has a circumferential groove 241, engaged by a yoke 242, carried by a clutch lever 243, which latter is fulcrumed on the bracket 244, secured to the bed plate 1. Said lever is automatically operated by a clutch cam 245, on a sleeve 246, which is loosely mounted upon the cam or counter-shaft 150, the latter being journaled at one end in the frames 3, and 4, and at the other end in a bracket depending from the bed plate 1. The sleeve 246 is intermittently rotated by means of a ratchet wheel 260 secured thereto, and which is engaged by a pawl 257, to be later described. As an additional means for pawling the clutch cam 245, an arm 221, is provided on the slide rod 218, which strikes a tappet 222, secured to the sleeve 246, and rotates said cam sufficiently to swing the clutch lever 243, and with it the clutch collar 240, to engage with the pinion 18, to produce rotary motion. This occurs when the change from oscillation to rotation is made.

(c) *Pattern chain and its pawling mechanism.*—The sleeve 246, also carries a ratchet 250, having blank portions 251, 252, across which the pawl 255, may idly pass except at those moments during which change from rotation to reciprocation or vice versa, is taking place. Said counter shaft or cam shaft 150, is provided at one end with a sprocket wheel 193, carrying the pattern chain 194, and at the other end with a ratchet wheel 260. In order to intermittently rotate the sleeve 246, and counter shaft 150 by their respective ratchets 250, and 260, a lever 261, is provided, which is fulcrumed on a stud 262, on the frame 4, and normally held in the position shown in Fig. IV by a spiral spring 263, connecting an eye 264, on said lever with said frame 4. Said lever 261, being thus arranged to be oscillated by the cam 212, at each rotation of the gear 210, is provided with a stud 265, upon which are pivoted a pawl 255, having an eye lug 256, and a pawl 257 having a finger 258. Said pawl 255, is normally upheld from engagement with its ratchet 250, by the engagement of its eye lug 256, with a finger 266, on a rock shaft 267. Said rock shaft 267, is rocked by a rocker arm 268, secured thereto, and adapted to be engaged by the high links 199, 203, 204 and 205, on the pattern chain 194. Said rock shaft and rocker arm are maintained in the position shown in the drawings by a coiled spring 270, secured to a collar 271, on said shaft and to the under side of the supporting leaf 2. The pawl 257, is arranged to turn the cam shaft 150, and the chain 194, by engagement with its ratchet 260, on said shaft; but is normally upheld from engagement during the continuous rotation of the cam cylinder by the finger 258, resting upon a pin 272, in the end of a lever 273, fulcrumed about a stud 274. The lower end of lever 273, is provided with an elongated slot 275, which receives a pin 276, on the end of a rocker arm 277 secured to a rock shaft 278, which is provided with an arm 280, having at its free end a shoe 281, arranged to be engaged by links 283, and 284, on a measuring chain 282.

(d) *Measuring mechanism and connections whereby it controls the movements of the pattern chain.*—Attached to said rock shaft 278, is a rearwardly extending arm 286, having an upwardly extending stop 287, adjustably secured thereto. Pivoted to the side of the bearing frame 2, is a lever 290, having a diagonally located lug 291, adapted to be engaged by pins 292, and 294, projecting from one side of the pattern chain 194. The lower end of said lever 290, is formed with a lateral projection 293, adapted to rest upon the free end of the arm 286, against the stop 287, when said arm is lowered by the engagement of one of the links on the measuring chain 282, with the shoe 281. When the lug 293, on lever 290, engages the arm 286, on shaft 278, continued pawling of the pattern chain 194 is permitted, owing to the release of the pawl 257, by means of the connection with the rock shaft 278, already described and shown best in Fig. IV. The movement of the pattern chain 194 is thereby subject to the control of the measuring chain 282. This pawling of the pattern chain 194 continues until the pin 294 thereon, engages the lug 291, to move lever 290 to cause its lower end or projection 293, to move out of the path of said arm 286. The lever 290, is pressed by a coiled spring 296, near its upper end, tending to move the lower end of said lever toward the right, as viewed in Fig. II.

The motion changing mechanism is controlled by the measuring mechanism. Said measuring mechanism, is carried by a horizontal frame 300, pivotally connected with a vertical frame 301, by a rod 302. A horizontal shaft 305, is journaled in said frame 300, and provided at one end with a band wheel 306, connected by a band 307, with a band wheel 308, on the main driving shaft 5, adjoining the bevel gear 7. On the other end of said shaft 305, is a ratchet wheel 303, with which a pawl 309, coöperates, and upon said shaft is also mounted a take up roller 310, which may be provided with a roughened periphery for contact with the fabric 311, as it passes from the machine. A guide roller 312, may also be provided over which the fabric passes and which keeps the fabric always in contact with the take up roller 310. A horizontal shaft 313, is journaled in a horizontal frame 316, secured to the vertical frame 301, and upon this shaft is a traction or brush roller 317, and a sprocket wheel 348, for the measuring chain 282. A weight may be attached to the outer end of the frame 300, to vary the tension under which the fabric 311, is drawn over the take up or measuring roll. The frictional engagement of the band 307, with its wheels 306, and 308, may also be thereby varied.

*VI. Relations of cams to various kinds of needles.*—In Fig. XII are shown diagrammatically the needles and the cams which coöperate with them. The dot and dash lines indicate the path taken by the double butt needles 93, and the dotted lines indicate those taken by the single butt needles 95. It will be noted that one of the single butt needles is omitted for the purpose of producing an openwork stripe 345, down the tube to indicate the center of the back of the finished stocking. The stitch cams 320, and 321, and the center cam 322, together with the guard cam 323, are located in the path of the butts of the single butt needles. It will be noted that the upper surface of the stitch cam 321, is lower than the upper surface of the stitch cam 320. This is for the purpose of controlling the needle 98, which has a long latch to produce a tuck stitch when the cam cylinder is oscillating in one direction, since by this construction said needle will not be raised high enough to cast its loop, whereas all the other single butt needles are raised sufficiently by said cam to cast their loops. When the cam cylinder moves in the opposite direction, the stitch cam 320, raises said needle 98, high enough to cast its loops. This tucking needle produces a mark 346, to indicate where the back seam of the heel is to be sewed when the stocking is being made. The raising cams 324, 325, 326 and 327, are of ordinary construction and perform their usual functions.

By reference to the left hand side of Fig. XII, it will be noted that when the cam cylinder is oscillated so that cams 320 to 325, are traversing the region of the double butt needles, the lower butts of said double butt needles come in contact with the left hand face of the stitch cam 320, and are raised thereby, whereupon their upper butts next come in contact with the outer left hand face of the auxiliary cam 91, which raises them sufficiently to cause their upper ends to follow line 328, and be too high to take the thread 45, which is being fed through the slot 37. The lower butts clear the top of the center cam 322, but come in contact with the inner right hand face of cam 91, by which they are lowered sufficiently to come into the path of the cam 330. The lower butts pass down the under left hand face of the cam 330, and thereupon the upper butts come in contact with the left hand face of the auxiliary cam 92, by which they are drawn down slightly into the path of the stitch cam 332, to form stitches with the thread 90. The single butt needles pass by the cams which control the stitch formation of the double butt needles in either direction without being affected by said cams.

The operation of the needles when the cylinder is moving in the direction opposite to that described above is thought to be clear without further explanation.

The guard cam 323, is mounted upon a vertical pin 335, and pressed by a spring 336. Under the action of spring 336, the cam 323 allows itself to be pressed outwardly by the lower butts of the double butt needles when the cylinder moves in the opposite direction to that indicated by the arrow in Fig. XII; the object of said cam 323, is to insure the engagement of the butts of all the needles with the permanent cam set during rotary knitting. A raising cam 340, is secured to a slide plate 341, mounted to slide upon the cam cylinder and provided with a finger hold 342, whereby the cam may be manually raised and lowered.

The operation of the machine is as follows: As shown in the drawings the machine is in the position for beginning the knitting of the tubular web 331, at about the region indicated by the line 333, in Fig. XIII. The knitting of the tubular web continues until the link 283, on the measuring chain 282, comes under the shoe 281, and tilts the arm 280, upwardly, and the extension 286, tilts downwardly. This partial rotation of the rock shaft 278, tilts the rocker arm 277, which moves the lever 273, to lower the pin 272, under finger 258, and thus allow the pawl 257, to engage the teeth on the ratchet 260, and rotate the shaft 150, and the sprocket wheel 193. Pin 292, on the pattern chain 194, is then moved from under the projection 291, on the lever 290, whereupon the lower end of said lever swings toward the right in Fig. II, and its lateral projection 293, moves over the end of arm 286, abutting against the stop 287, and maintaining the shoe 281, in its raised position. Thus the pawl 257, will continue to step its ratchet around and with it the sprocket 193. When the high link 203, engages the rocker arm 268, the pawl 255, is lowered and steps the ratchet 250, around to cause the sleeve 246, and the clutch cam 245, to rotate and thereby move the clutch lever 243, to throw the clutch to change from rotation to oscillation. The knitting of the webs 348, and 349, is thus commenced at the line 347. The pawl 255, due to the further action of the links 204 and 205 continues to step the ratchet 250, around until the space 252, is reached, whereupon it moves idly across said space. Links 204, and 205, merely cause the pawl 255, to be lowered to step the ratchet past two spaces in which a tooth has been omitted, but which have no bearing upon the present invention. Next the high side link 195, engages the tappet arm 191, and the cam 151, is thus thrown into the path of the finger 42, which is swung outwardly, thereby lowering the thread finger 38, and bringing the thread 45, into action. Simultaneously therewith, the cam 146, engages lever 140, and cam 152, is thrown into the path of finger 78, which lowers the thread finger 74, and brings the thread 90, into action. The auxiliary cams 91, and 92, are also pushed in simultaneously with the throwing in of cam 152. Next the pin 294, on chain 194, comes in contact with the lug 291, thus freeing the arm 286, from the projection 293, and allowing the shoe 281, to drop and partially rotate the rock shaft 278. This raises the pawl 257, from its ratchet and the sprocket wheel 193, ceases to rotate. Reciprocatory knitting thus continues until the link 284, on the measuring chain 282, raises the shoe 281. The sprocket 193, then begins to rotate, the pin 294, passes from under the lug 291, and lever 290, moves over to hold down the arm 286, as described above. The pattern chain is thus progressed and the high side link 196, engages the catch 200, and frees the tappet arm 191, momentarily, which drops, and cam 151, is moved outwardly into the path of the finger 42, thereby causing the thread finger 38, to be raised. This withdraws the thread 45, and a single yarn course 350, is thereby formed in the double yarn or spliced web 349, for marking purposes. Immediately thereafter the high link 197, engages the tappet arm 191, to reset the cam 151, to throw the thread 45, again into action. Next the long high link 199, engages the rocker arm 268, to lower the pawl 255, into action. This link is sufficiently long to allow the pawl 255, to operate twice, and thereby rotate the sleeve 246, sufficiently to bring the tappet 222, into the path of the arm 221, which rotates the tappet and the clutch cam 245, sufficiently to throw the clutch lever 243, back into the position shown in Fig. I, and rotary motion then takes place. At the same time cam 146, is rotated away from the lever 140, which then resumes its normal position. In resuming this position, the cams 91, and 92, are withdrawn from action, and the cam 152, is swung outwardly to the path of the finger 78, to withdraw thread finger 74, and with it the thread 90. The high link 198, raises the hook 200, thus freeing the tappet arm 191, and allowing the sleeve 189, to rotate and, by means of the intervening connections, swing the cam 151, outwardly into the path of the finger 42, to withdraw the thread finger 38, and with it the thread 45. Thereupon circular knitting with the thread 86, is proceeded with and the same cycle of operations is repeated.

Having thus described my invention, I claim:

1. In a circular knitting machine, the combination of a group of single butt needles, a group of double butt needles, two separated sets of stitch cams relatively fixed with respect to each other, coöperating thread guides therefor, and selective means for causing one set of stitch cams to operate alone on both groups of needles at one of said thread guides, and for causing said sets of stitch cams to operate at the same time and independently on the respective groups of needles, at each of said thread guides.

2. In a circular knitting machine, the combination of a group of single butt needles, a group of double butt needles, two separate sets of stitch cams relatively fixed with respect to each other, coöperating thread guides therefor, selective auxiliary cams for causing one set of stitch cams to operate alone on both groups of needles at one of said thread guides, and for causing said sets of stitch cams to operate at the same time and independently on the respective groups of needles at each of said thread guides, and means for throwing said auxiliary cams into and out of action.

3. In a circular knitting machine, the combination of a group of single butt needles, a group of double butt needles, two separated sets of stitch cams relatively fixed with respect to each other, coöperating thread guides therefor, selective means for causing one set of stitch cams to operate alone on both groups of needles at one of said thread guides and for causing said sets of stitch cams to operate at the same time and independently on the respective groups of needles at each of said thread guides, and automatic means for throwing said thread guides into and out of action.

4. In a circular knitting machine, the combination of a group of single butt needles, a group of double butt needles, two separate sets of stitch cams relatively fixed with respect to each other, coöperating thread guides therefor, selective auxiliary cams for causing one set of stitch cams to operate alone on both groups of needles at one of said thread guides, and for causing said sets of stitch cams to operate at the same time and independently on the respective groups of needles at each of said thread guides, means for throwing said auxiliary cams into and out of action, and automatic means for throwing said thread guides into and out of action.

5. In a circular knitting machine, the combination with the knitting cylinders; of two independently controlled series of needles; independent thread feeding mechanism for each series operable during reciprocatory knitting; means for producing an openwork stripe throughout the entire length of the fabric; and means for producing a line of tuck stitches during reciprocatory knitting.

6. In a circular knitting machine, the combination of a group of single butt needles, a group of double butt needles, separate sets of stitch cams, relatively fixed with respect to each other, one of said sets of stitch cams being positioned to engage the single butt needles and the lower butts of the double butt needles when the cam cylinder is rotated and the other set of stitch cams being positioned to engage the upper butts of the double butt needles only, means for rendering said last named stitch cams ineffective when said machine is rotated, and means for rendering the first named cams ineffective to engage the double butt needles when the cam cylinder is reciprocated.

7. In a circular knitting machine, the combination of a group of single butt needles, a group of double butt needles, separate sets of stitch cams relatively fixed with respect to each other, one of said sets of stitch cams being positioned to engage the single butt needles and the lower butts of the double butt needles when the cam cylinder is rotated and the other set of stitch cams being positioned to engage the upper butts of the double butt needles only, means for rendering said last named stitch cams ineffective when said machine is rotated, and means for rendering the first named stitch cams ineffective to engage the double butt needles when the cam cylinder is reciprocated, movable thread guides for feeding a thread to each group of needles, and automatic means for throwing said guides into and out of action.

8. In a circular knitting machine, the combination of two independent groups of needles, two separated sets of stitch cams relatively fixed with respect to each other, two spaced thread guides coöperating respectively with the sets of stitch cams, selective means for causing one set of stitch cams to operate alone on both groups of needles at one of said thread guides, and for causing said sets of stitch cams to operate at the same time and independently on the respective groups of needles at each of said thread guides, and automatic means for throwing said thread guides into and out of action.

9. In a circular knitting machine, the combination of two groups of needles, two separate sets of stitch cams relatively fixed with respect to each other, thread guides coöperating respectively with said sets of stitch cams, an auxiliary cam for each set of stitch cams, means for controlling said auxiliary cams whereby one set of stitch cams is caused to operate alone on both groups of needles at one of said thread guides, and for throwing out of action one of said thread guides during such coöperation, and for causing said sets of stitch cams to operate at the same time and independently on the respective groups of needles at each of said thread guides, and for throwing into action said thread guides during such coöperation.

10. In a circular knitting machine, the combination of a series of single-butt and a series of double-butt needles; a set of stitch cams for each series of needles; an auxiliary cam located above the single-butt needle cams for raising the double-butt needles above the thread feeding level of the single-butt needles; an auxiliary cam above the double-butt needle stitch cams for lowering said double-butt needles to coöperate with their stitch cams; and means for moving said auxiliary cams into operative position for reciprocatory knitting.

11. In a circular knitting machine, the combination of a series of single-butt and a series of double-butt needles; a set of stitch cams for each series of needles; an auxiliary cam located above the single-butt needle cams for raising the double-butt needles above the thread feeding level of the single-butt needles; an auxiliary cam above the double-butt needle stitch cams for lowering said double-butt needles to coöperate with their stitch cams; and automatic means for moving said auxiliary cams into operative position for reciprocatory knitting, and withdrawing them for circular knitting.

12. In a circular knitting machine, the combination of a needle cylinder; a cam cylinder; a series of single-butt needles; a complementary series of double-butt needles; a set of stitch cams for each series permanently located at different levels and on opposite sides of said cam cylinder and mechanism for causing said sets of stitch cams to act selectively upon said series of needles whereby when said cam cylinder is rotated, one set of stitch cams operates upon both series of needles and whereby when said cylinder is reciprocated, said sets of stitch cams operate independently upon said series of needles.

In testimony whereof, I have hereunto signed my name, at Philadelphia, Pennsylvania, this twelfth day of September 1908.

JOSEPH T. PAXTON.

Witnesses:
JAMES H. BELL,
E. L. FULLERTON.